(12) United States Patent
Duan et al.

(10) Patent No.: US 11,220,892 B2
(45) Date of Patent: Jan. 11, 2022

(54) TUBING FOR ELECTRIC SUBMERSIBLE PUMPS USED IN OIL PRODUCTION

(71) Applicant: SHINDA (TANGSHAN) CREATIVE OIL & GAS EQUIPMENT CO., LTD., Tangshan (CN)

(72) Inventors: Jianliang Duan, Tangshan (CN); Jian Dong, Tangshan (CN); Shujun Zhang, Tangshan (CN); Xiang Liu, Tangshan (CN); Yueqing Lin, Tangshan (CN)

(73) Assignee: SHINDA (TANGSHAN) CREATIVE OIL & GAS EQUIPMENT CO., LTD., Tangshan (CN)

( * ) Notice: Subject to any disclaimer, the term of this patent is extended or adjusted under 35 U.S.C. 154(b) by 0 days.

(21) Appl. No.: 16/946,568

(22) Filed: Jun. 26, 2020

(65) Prior Publication Data

US 2021/0198990 A1     Jul. 1, 2021

(30) Foreign Application Priority Data

Dec. 31, 2019   (CN) .......................... 201911411111.0

(51) Int. Cl.
| | |
|---|---|
| *E21B 17/20* | (2006.01) |
| *E21B 43/12* | (2006.01) |
| *E21B 17/00* | (2006.01) |
| *F16L 11/127* | (2006.01) |

(52) U.S. Cl.
CPC .......... *E21B 43/128* (2013.01); *E21B 17/003* (2013.01); *E21B 17/206* (2013.01); *F16L 11/127* (2013.01)

(58) Field of Classification Search
CPC .... E21B 43/128; E21B 17/003; E21B 17/206; E21B 17/20; F16L 11/127; H01B 7/04; H01B 3/30; H01B 7/18
See application file for complete search history.

(56) References Cited

U.S. PATENT DOCUMENTS

| | | | | |
|---|---|---|---|---|
| 5,172,765 | A * | 12/1992 | Sas-Jaworsky | ....... E21B 17/206 166/384 |
| 8,746,289 | B2 * | 6/2014 | Quigley | ................ F16L 11/127 138/137 |
| 9,281,675 | B2 * | 3/2016 | Cox | .......................... H02G 1/08 |
| 9,587,445 | B2 * | 3/2017 | Dalrymple | .............. F04D 13/10 |
| 10,043,600 | B1 * | 8/2018 | Shangguan | .......... H01B 7/0275 |
| 10,914,410 | B2 * | 2/2021 | Zhao | ...................... F16L 11/083 |
| 2008/0066920 | A1 * | 3/2008 | Allcorn | ................... E21B 37/00 166/312 |

(Continued)

*Primary Examiner* — Taras P Bemko
(74) *Attorney, Agent, or Firm* — Smith & Hopen, P.A.; Paul Murty

(57) ABSTRACT

A tubing for an electric submersible pump (ESP) for oil production. Cables are wrapped outside a first outer sheath at equal intervals; an inner side of the cable is covered with an insulating layer; an inner side of the insulating layer is covered with an aluminum tape; and a conductor is nested inside the aluminum tape. The inner pipe is combined with the cable to meet the oil production requirement of a coiled tubing (CT) and solve a power transmission problem of the submersible pump. The first outer sheath and a second outer sheath ensure that the tubing has a high bearing capacity and stability inside. A first steel belt and a second steel belt ensure a high resistance to pulling and deformation inside the tubing in use.

6 Claims, 4 Drawing Sheets

(56) References Cited

U.S. PATENT DOCUMENTS

2015/0129241 A1* 5/2015 Lee .................. E21B 17/20
166/385
2015/0294763 A1* 10/2015 Varkey ............. G02B 6/4416
385/101

* cited by examiner

TUBING FOR ELECTRIC SUBMERSIBLE PUMPS USED IN OIL PRODUCTION

CROSS-REFERENCE TO RELATED APPLICATIONS

This nonprovisional application is a continuation of and claims priority to international application No. CN 201911411111.0, entitled "Novel special tubing for electric submersible pump for oil production and preparation method thereof," filed Dec. 31, 2019, by the same inventors.

BACKGROUND OF THE INVENTION

1. Field of the Invention

This invention relates, generally, to oilfield tubing. More specifically, it relates to a novel tubing for an electric submersible pump (ESP) used in oil production.

2. Brief Description of the Prior Art

At present, the traditional way of oil production includes the use of submersible pumps and oil transportation via steel pipes. These traditional methods are widely used in domestic and foreign oilfields. However, the submersible pump needs to be regularly lifted for cleaning, and it is difficult to run the oil pipe down an oil well, connect the pipeline, and turn the pipeline. Meanwhile, a cable together with coiled tubing (CT) needs to go down the oil well, and the cable must be fixed on the CT continuously during the process of going down the well, making the operation difficult and the labor cost high. Moreover, the cable tends to rub against the casing outside the CT, so that the fixed cable causes the overall center of the CT and the cable to shift. As a result, the tubing is damaged in the process of use and windup, and the space utilization between the CT and the casing is low.

Accordingly, what is needed is a novel tubing for use in combination with electric submersible pumps used for oil production. However, in view of the art considered as a whole at the time the present invention was made, it was not obvious to those of ordinary skill in the field of this invention how the shortcomings of the prior art could be overcome.

All referenced publications are incorporated herein by reference in their entirety.

Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a combined tubing and cable used for an electric submersible pump for oil production is now met by a new, useful, and nonobvious invention.

The novel structure includes an inner pipe and a first steel belt spirally wrapped about an exterior surface of the inner pipe. A first outer sheath encloses each of the inner pipe and the first steel belt. A plurality of cables are circumferentially disposed about an exterior surface of the first outer sheath, such that adjacent cables of the plurality of cables are spaced apart from each other at equal distances. Each cable includes an interior surface enclosing an insulating layer, the insulating layer enclosing an amount of an aluminum tape, the amount of the aluminum tape enclosing a conductor therein. In an embodiment, the plurality of cables includes four cables, wherein three of the conductors are power transmission conductors and one of the conductors is a grounding conductor. A cable sheath encloses the plurality of cables and a second steel belt spirally wrapped about an exterior surface of the cable sheath. A second outer sheath encloses each of the cable sheath and the second steel belt.

In an embodiment, a steel wire mesh is wrapped about an exterior surface of the second outer sheath, and a protective sleeve encloses the steel wire mesh. A plurality of wear-resistant strips may be bonded to an exterior surface of the protective sleeve, such that adjacent wear-resistant strips of the plurality of wear-resistant strips are spaced apart from each other at equal distances. Each of the protective sleeve and the plurality of wear-resistant strips may be made of a wear-resistant rubber material.

A method of coiling a tubing for use in combination with an electric submersible pump includes steps of straightening an inner pipe, and enclosing an exterior surface of the inner pipe with a first steel belt. The straightened inner pipe and the first steel belt are passed through a die. Via an extrusion device, a first outer sheath is extruded on the exterior surface of the inner pipe and an exterior surface of the first steel belt. The method includes a step of cooling the inner pipe, the first steel belt, and the first outer sheath in an amount of water. After cooling, the inner pipe, the first steel belt, and the first outer sheath are coiled onto a first spool. The inner pipe, the first steel belt, and the first outer sheath are enclosed with a cable sheath via a cable stranding machine. A plurality of cables are circumferentially disposed about an exterior surface of the first outer sheath.

The method includes a step of extruding a second outer sheath about an exterior surface of the plurality of cables and the cable sheath, thereby enclosing the plurality of cables and the cable sheath. Via a weaving device, the method includes a step of weaving a steel wire mesh about an exterior surface of the second outer sheath. Via a rubber extrusion device, a protective sleeve is extruded about an exterior surface of the steel wire mesh to form a final tubing. The final tubing is cooled and coiled onto a second spool.

An object of the invention is to combine the tubing and cabling of an electric submersible pump for oil production to improve safety and efficiency of oil production.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a tubing for an electric submersible pump (ESP) for oil production. Cables are wrapped outside a first outer sheath at equal intervals; an inner side of the cable is covered with an insulating layer; an inner side of the insulating layer is covered with an aluminum tape; and a conductor is nested inside the aluminum tape. The inner pipe is combined with the cable to meet the oil production requirement of a coiled tubing (CT) and solve a power transmission problem of the submersible pump. The first outer sheath and a second outer sheath ensure that the tubing has a high bearing capacity and stability inside. A first steel belt and a second steel belt ensure a high resistance to pulling and deformation inside the tubing in use.

Figure 1:
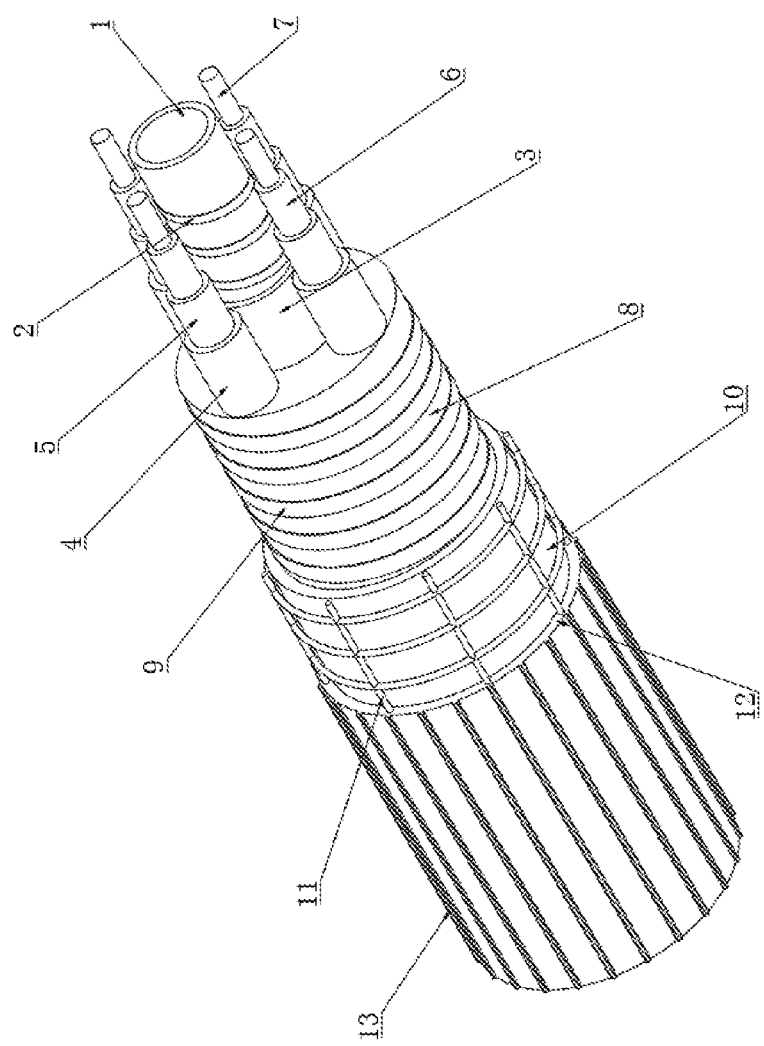
FIG. 1 is a schematic structural diagram of a tubing structure, in accordance with an embodiment of the present invention.
Figure 2:
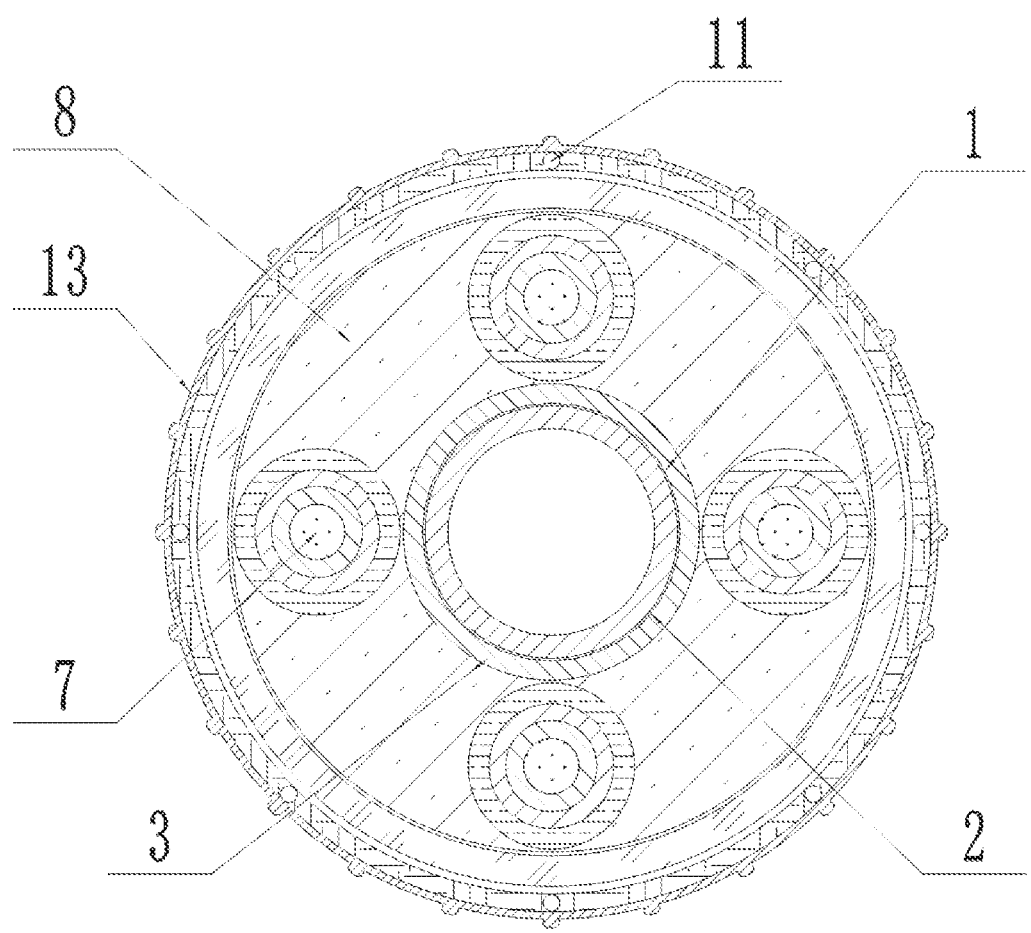
FIG. 2 is a sectional diagram of the tubing structure of FIG. 1.

As shown in FIGS. 1-2, an embodiment of the present invention includes a novel special tubing for an electric submersible pump (ESP) for oil production. The tubing includes an inner pipe 1. A first steel belt 2 is spirally wrapped around the inner pipe 1. The inner pipe 1 and the first steel belt 2 are covered with a first outer sheath 3 on the outside. Cables 4 are wrapped outside the first outer sheath 3 at equal intervals. An inner side of the cable 4 is covered with an insulating layer 5. An inner side of the insulating layer 5 is covered with an aluminum tape 6. A conductor 7 is nested inside the aluminum tape 6. As shown in FIGS. 1-2, four conductors 7 are provided, and the four conductors 7 are all annealed copper conductors. Of these conductors, three conductors 7 are used for power transmission and one conductor 7 is used for earthing. The four conductors 7 are evenly wrapped outside the first outer sheath 3, which ensure power transmission and also transmit induced current to the earth to ensure safety.

The cables 4 are covered with a cable sheath 8 on the outside. A second steel belt 9 is spirally wrapped outside the cable sheath 8. The cable sheath 8 and the second steel belt 9 are covered with a second outer sheath 10 on the outside. The first steel belt 2 and the second steel belt 9 are wrapped around the inner pipe 1 and the cable sheath 8 respectively by a wrapping machine. The first outer sheath 3 and the second outer sheath 10 cover the outside of the inner pipe 1 and the cable sheath 8, respectively, via an extrusion device. The first steel belt 2 and the second steel belt 9, as well as the first outer sheath 3 and the second outer sheath 10, improve the stability of the tubing.

Also shown in FIGS. 1-2, a fixing steel wire mesh 11 is wrapped around the second outer sheath 10, and a protective sleeve 12 encloses the fixing steel wire mesh 11. Wear-resistant strips 13 are bonded to the outside of the protective sleeve 12 at equal angles and spacing between adjacent wear-resistant strips 13, as shown in particular in FIG. 1. Both the protective sleeve 12 and the wear-resistant strips 13 are made of wear-resistant rubber, so that the protective sleeve 12 and the wear-resistant strips 13 have high wear resistance in a practical application.

Figure 3:
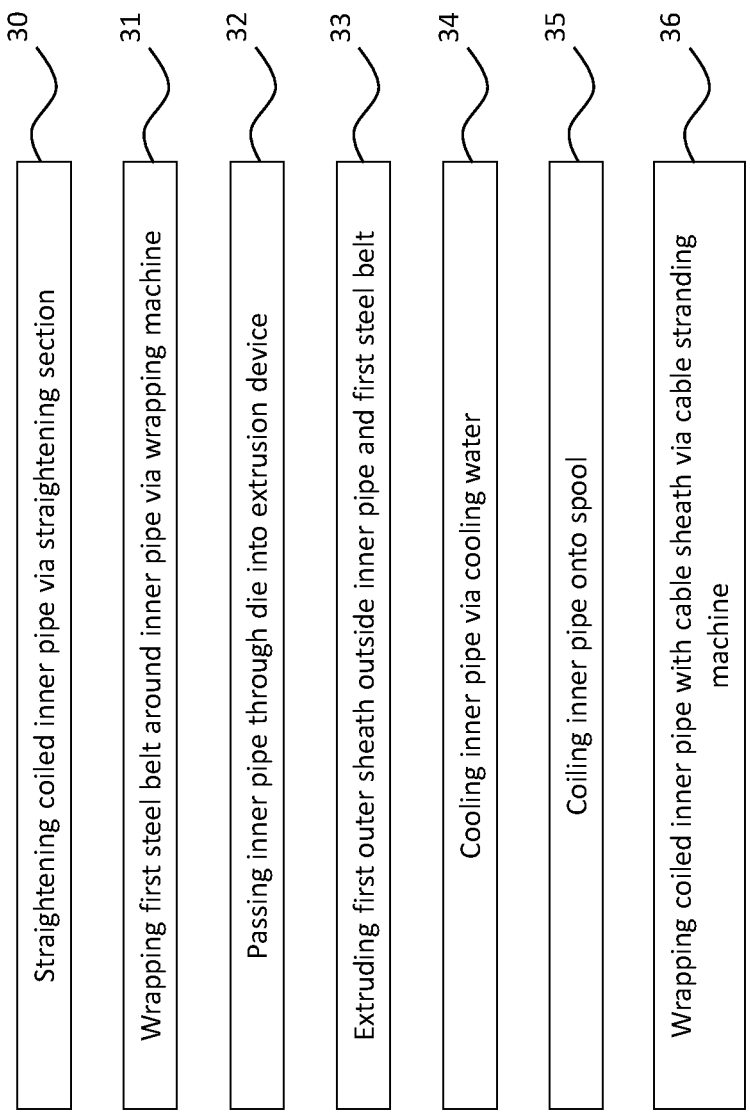
FIG. 3 is a process flow diagram describing a method of extruding a first outer sheath, in accordance with an embodiment of the present invention.
Figure 4:
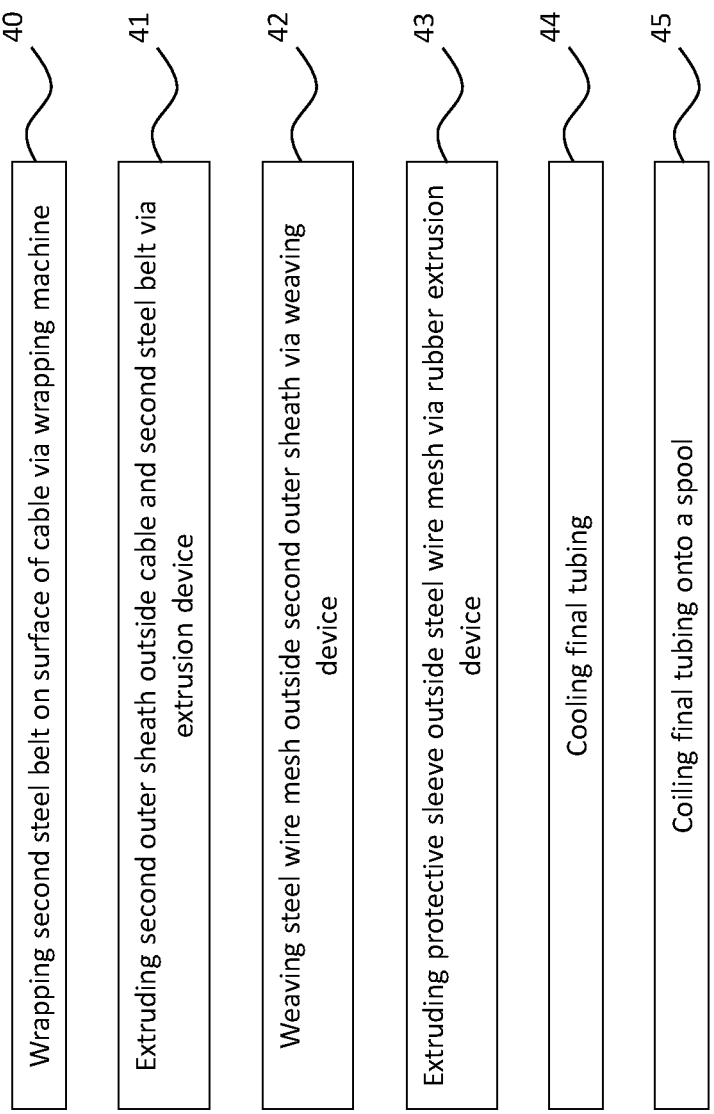
FIG. 4 is a process flow diagram describing a method of stranding a cable, in accordance with an embodiment of the present invention.

Referring now to FIGS. 3-4, the tubing of FIGS. 1-2 is formed by straightening a coiled inner pipe 1 via a straightening section (step 30). Afterwards, a first steel belt 2 is wrapped around the inner pipe 1 by a wrapping machine (step 31). Next, the inner pipe 1 is passed through a die to enter into an extrusion device (step 32), so that a first outer sheath 3 is extruded outside the inner pipe 1 and the first steel belt 2 (step 33). After the first outer sheath 3 is extruded, the inner pipe 1 is cooled by cooling water (step 34), and after the cooling, the inner pipe 1 is coiled onto a spool (step 35). The sheathed inner pipe 1 that is coiled onto the spool is then released after cooling, and subsequently wrapped on a cable sheath 8 by a cable stranding machine (step 36).

A second steel belt 9 is then wrapped on a surface of a cable 4 by the wrapping machine (step 40), and after the wrapping, a second outer sheath 10 is extruded outside the cable 4 and the second steel belt 9 by the extrusion device (step 41). After the second outer sheath 10 is extruded, a steel wire mesh 11 is woven outside the second outer sheath 10 by a weaving device (step 42), a protective sleeve 12 is extruded outside the steel wire mesh 11 by a rubber extrusion device (step 43), and the final tubing is cooled (step 44) and coiled onto a spool (step 45).

Results

TABLE 1

| Model | Specification | | | Conductor Type | Wire Drawing | | | Minimum DC Resistance of Conductor at 20° C. (Ω/km) |
| --- | --- | --- | --- | --- | --- | --- | --- | --- |
| | | | | | Wire Diameter | Deviation | Elongation ≥ % | |
| ICCT-HDPE-73 | 3 | x | 4 | Copper conductor | 5.19 | ±0.03 | 30% | 0.8315 |
| | 1 | x | 6 | Copper conductor | 4.12 | ±0.03 | 30% | 1.323 |
| | 1 | x | Oil tube | | | | | |

TABLE 2

Data of steel pipe

| | Steel Pipe | | | |
| --- | --- | --- | --- | --- |
| Material | Outer Diameter | Deviation | Wall Thickness | Outer Diameter |
| 2205 | 38.1 | ±0.1 | 2.8 | 5.19 4.12 38.1 |

TABLE 3

Insulation extrusion data
Insulation Extrusion

| Material | Thinnest | Nominal | Outer Diameter | Minimum Outer Diameter | Maximum Outer Diameter | Color | Extrusion Mode | Die Core | Die Sleeve |
| --- | --- | --- | --- | --- | --- | --- | --- | --- | --- |
| EPR | 1.61 | 1.9 | 9.0 | 8.8 | 9.3 | Black | Extruding | 5.5 | 9.0 |
| EPR | 2.10 | 2.4 | 9.0 | 8.8 | 9.3 | Black | Extruding | 4.4 | 9.0 |
| HDPE | 0.53 | 0.7 | 39.50 | 39.3 | 40.0 | Black | Tube extruding | 43.1 | 48.9 |

TABLE 4

Nylon tape wrapping data

| Model | Specification | | | Layers | Nylon Tape Wrapping | | | | Outer Diameter |
| --- | --- | --- | --- | --- | --- | --- | --- | --- | --- |
| | | | | | Thickness | Width | Coverage | Color | |
| ICCT-HDPE-73 | 3 | x | 4 | 1 | 0.1 | 25 | 20% | Yellow, green and red | 9.3 |
| | 1 | x | 6 | 1 | 0.1 | 25 | 20% | Blue | 9.3 |
| | 1 | x | Oil tube | | | | | | |

TABLE 5

Core winding data
Core Winding

| Direction | Pitch | Outer Diameter |
| --- | --- | --- |
| Right | 696.96-813 | 58.1 |

TABLE 6

| Comparison data | | | | | | | | | | | |
|---|---|---|---|---|---|---|---|---|---|---|---|
| Black HDPE inner sheath (Delta) | | | | | | Black HDPE outer sheath (Delta) | | | | | |
| Material | Thinnest | Nominal | Outer Diameter | Minimum Outer Diameter | Maximum Outer Diameter | Material | Thinnest | Nominal | Outer Diameter | Minimum Outer Diameter | Maximum Outer Diameter |
| DPE | 1.01 | 1.3 | 60.7 | 60.2 | 61.2 | HDPE | 5.2 | 6.2 | 73.1 | 72.1 | 74.1 |

The tubing made with the above data meets the pitch requirement, and the thinnest point of the extruded outer sheath is not less than a thickness required by the process so as to maintain the outer diameter. The process inspection refers to a plastic process inspection standard. The finished product inspection refers to a finished product inspection specification.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A tubing for use in combination with an electric submersible pump for oil production, the tubing comprising:
    an inner pipe and a first steel belt spirally wrapped around an exterior surface of the inner pipe;
    a first outer sheath enclosing each of the inner pipe and the first steel belt;
    a plurality of cables circumferentially disposed around an exterior surface of the first outer sheath, wherein adjacent cables of the plurality of cables are spaced apart from each other at equal distances, each of the plurality of cables comprising:
        an interior surface enclosing an insulating layer, the insulating layer enclosing an amount of an aluminum tape, the amount of the aluminum tape enclosing a conductor therein;
    a cable sheath enclosing the plurality of cables and a second steel belt spirally wrapped around an exterior surface of the cable sheath; and
    a second outer sheath enclosing each of the cable sheath and the second steel belt.

2. The tubing of claim 1, further comprising a steel wire mesh wrapped around an exterior surface of the second outer sheath, and a protective sleeve enclosing the steel wire mesh.

3. The tubing of claim 2, further comprising a plurality of wear-resistant strips bonded to an exterior surface of the protective sleeve, wherein adjacent wear-resistant strips of the plurality of wear-resistant strips are spaced apart from each other at equal distances.

4. The tubing of claim 3, wherein each of the protective sleeve and the plurality of wear-resistant strips are made of a wear-resistant rubber material.

5. The tubing of claim 1, wherein the plurality of cables comprises four cables, wherein three of the conductors are power transmission conductors and one of the conductors is a grounding conductor.

6. A method of coiling a tubing for use in combination with an electric submersible pump for oil production, the method comprising steps of:
    straightening an inner pipe, and enclosing an exterior surface of the inner pipe with a first steel belt;
    passing the straightened inner pipe and the first steel belt through a die, and, via an extrusion device, extruding a first outer sheath on the exterior surface of the inner pipe and an exterior surface of the first steel belt;
    cooling the inner pipe, the first steel belt, and the first outer sheath in an amount of water;
    after cooling, coiling the inner pipe, the first steel belt, and the first outer sheath onto a first spool;
    enclosing the inner pipe, the first steel belt, and the first outer sheath with a cable sheath via a cable stranding machine;
    circumferentially disposing a plurality of cables around an exterior surface of the first outer sheath;
    extruding a second outer sheath around an exterior surface of the plurality of cables and the cable sheath, thereby enclosing the plurality of cables and the cable sheath;
    via a weaving device, weaving a steel wire mesh around an exterior surface of the second outer sheath;
    extruding, via a rubber extrusion device, a protective sleeve around an exterior surface of the steel wire mesh to form a final tubing;
    cooling the final tubing; and
    coiling the final tubing onto a second spool.

* * * * *